(12) United States Patent
Vanderpan

(10) Patent No.: US 6,301,828 B1
(45) Date of Patent: Oct. 16, 2001

(54) BUD CLIP

(76) Inventor: Ronald D. Vanderpan, 86 Glen Lake Dr., Pacific Grove, CA (US) 93950

( * ) Notice: Subject to any disclaimer, the term of this patent is extended or adjusted under 35 U.S.C. 154(b) by 0 days.

(21) Appl. No.: 09/321,691

(22) Filed: May 28, 1999

(51) Int. Cl.[7] .................................................. A01G 17/04
(52) U.S. Cl. ...................................................... 47/7; 47/47
(58) Field of Search ................... 47/6, 7, 44, 46, 47/47, 42, 43, 41.14, 41.15; A01G 1/06, 17/10, 17/12, 17/14

(56) References Cited

U.S. PATENT DOCUMENTS

| | | | |
|---|---|---|---|
| 1,316,467 | * | 9/1919 | Tollis .......................................... 47/7 |
| 1,376,686 | * | 5/1921 | Fleckner .................................... 47/43 |
| 1,886,531 | * | 11/1932 | Dalchow ...................................... 47/7 |
| 2,462,442 | * | 2/1949 | Wallace .................................. 248/538 |
| 2,844,913 | * | 7/1958 | Brill, Jr. ...................................... 47/6 |
| 2,903,823 | * | 9/1959 | Westford .................................... 47/47 |
| 2,931,603 | * | 4/1960 | Johnston et al. ....................... 248/538 |
| 4,176,494 | * | 12/1979 | Boucher et al. ........................... 47/47 |
| 4,922,654 | * | 5/1990 | Hawke ...................................... 47/47 |
| 5,473,839 | * | 12/1995 | Stidham .................................... 47/47 |
| 5,617,672 | * | 4/1997 | Garrett ...................................... 47/58 |

FOREIGN PATENT DOCUMENTS

| | | | |
|---|---|---|---|
| 101266 | * | 10/1897 | (DE) ................................. 47/42 T |
| 392148 | * | 6/1922 | (DE) ................................. 47/43 R |
| 823064 | * | 11/1951 | (DE) ........................................ 47/7 |
| 66414 | * | 9/1950 | (NL) ........................................ 47/7 |
| 1464965 | * | 3/1989 | (SU) ........................................ 47/7 |
| 99/25172 | * | 5/1999 | (WO) ............................. A01G/9/12 |

* cited by examiner

Primary Examiner—Charles T. Jordan
Assistant Examiner—Son T. Nguyen
(74) Attorney, Agent, or Firm—Gray Cary Ware & Freidenrich

(57) ABSTRACT

A bud clip is provided that ensures that a bud grows straight during the budding process. The bud clip may clip onto the root stock so that the bud clip does not girdle the root stock and does not need to be removed from the root stock. The bud clip may bind the bud to the root stock during the fall bonding process and then ensure the vertical growth of the bud during the spring. The bud clip may be biodegradable and may be impregnated with fertilizers.

2 Claims, 3 Drawing Sheets

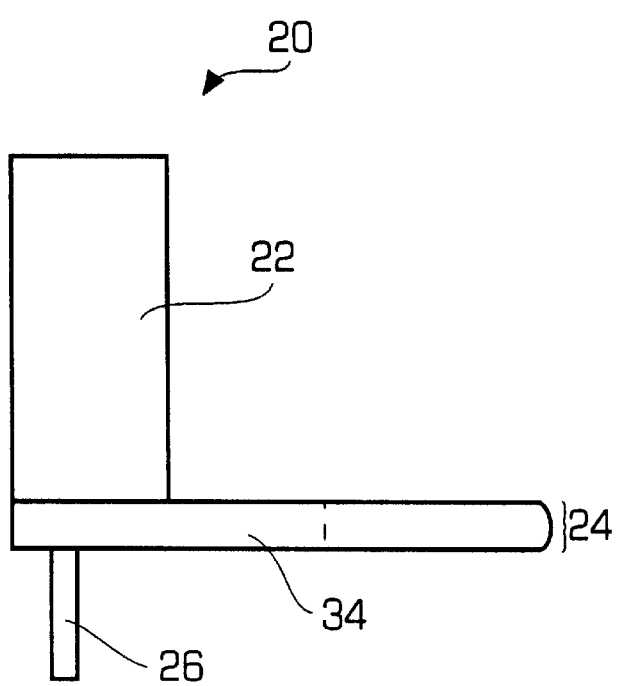
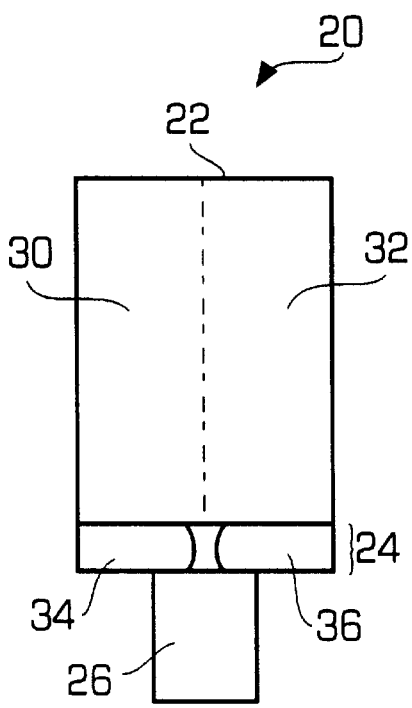
FIG. 3A  FIG. 3B
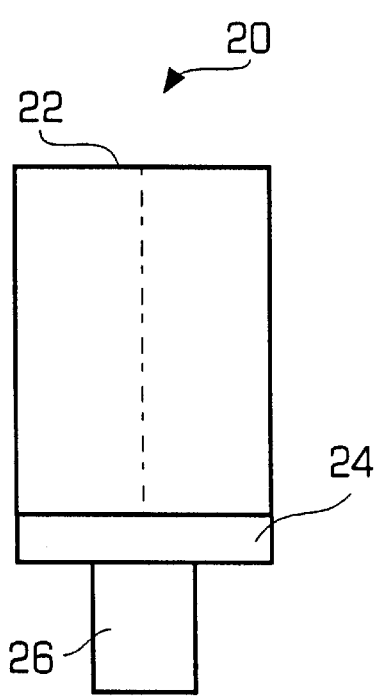
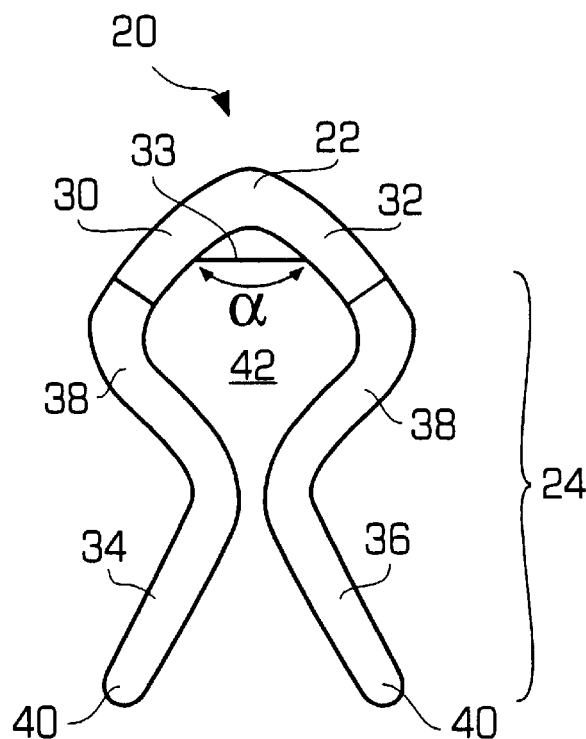
FIG. 3C  FIG. 3D

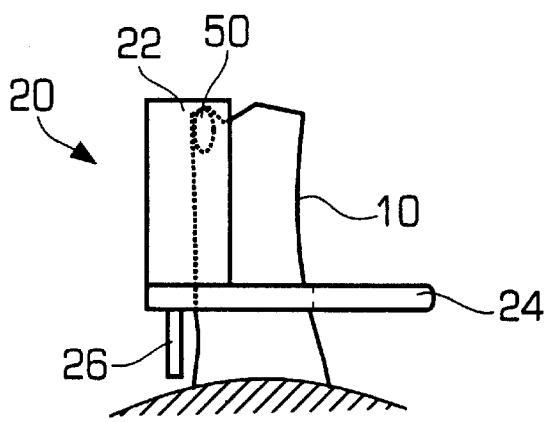
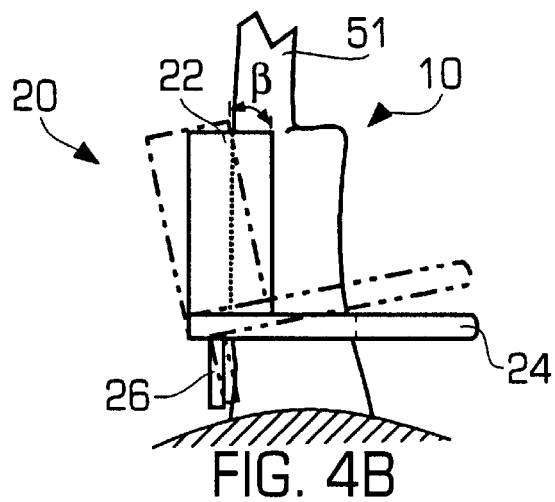
FIG. 4A
FIG. 4B
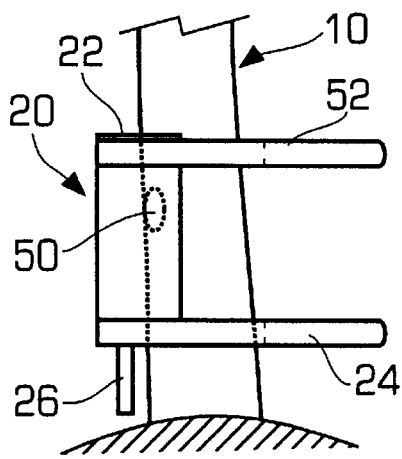
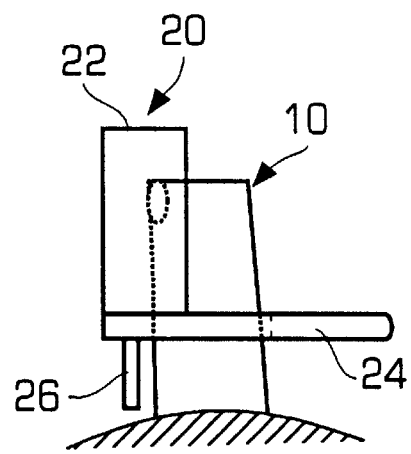
FIG. 5A
FIG. 5B
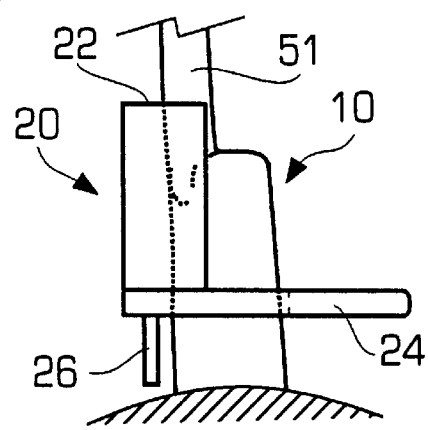
FIG. 5C

BUD CLIP

BACKGROUND OF THE INVENTION

This invention relates generally to a device for training a newly budded tree to grow straight. It is common practice for a nursery or gardener to graft a bud onto a tree or root stock. For example, the gardener or nursery may desire to create a tree with both lemons and limes or may desire to use a particular good root stock for a particular type of tree. Generally, a bud from a particular seed type (e.g., olives, apricots, plums, etc.) may be budded onto another root stock of the same type while a bud from a citrus tree (e.g., lemon, line, orange, etc.) may be budded onto another citrus tree. Nurseries often put a bud onto a good root stock to produce a good tree.

To bud a tree, the bud is inserted into the tree or root stock in the fall as a "T" bud or a chip bud. The location where the bud is inserted into the tree or root stock is then bound together to facilitate the bonding of the bud with the tree. During the fall, the bud bonds with the tree, but does not grow. In the spring, the root stock above the bud is cut back so that the growing energy of the root stock is focused on the bud. Assuming that the bud bonded properly to the root stock, the bud may then begin to grow and produce a shoot. The nursery may also perform a spring budding in which the bud is inserted into the root stock during the spring and then the bud shoot grows. The problem with these budding processes is that the shoot from the bud will typically begin to grow straight out from the root stock parallel to the ground and perpendicular to the root stock. After some period of time, the bud shoot will bend and begin to grow towards the sun. However, if there is no supervision of the bud's growth, the tree resulting from the budding process will have a permanent crook in it. The crook does not substantially affect the strength or fruit producing ability of the tree, but consumers are less likely to purchase a tree which has a crook in it. In addition, the competition in the nursery industry is making it harder to sell a tree that is less than perfect since there is usually a perfect tree available from another nursery at the same price.

Typically, people who are budding a root stock may perform green training to ensure that the bud's shoot grows straight up. Green training involves tying the new green shoot up to a training rod several times while the shoot is small. The problem with green training is that it is a costly labor intensive process which increases the cost to the consumer of the tree or decreases the nursery's profit margin for the tree. Another technique is to place a metal deflector near the bud as it grows so that the deflector forces the bud's shoot to grow vertically. After the metal defector has been placed near the bud, a work crew must then readjust the position of the metal deflector a week after the initial placement to ensure it has been appropriately positioned. The metal deflector may then be retrieved once the bud is growing straight. The problem with the metal deflector is that the metal deflector is relatively expensive and must be retrieved so that it can be reused. Another more labor intensive technique to ensure the straight growth of the bud shoot is to manually place two wraps of masking tape around the bud.

It is desirable to provide a device which reduces the labor costs of the budding process, is inexpensive and ensures that a bud's shoot grows straight. It is also desirable to provide a device which may be used to 1) bind the bud to the root stock during the fall when the bud bonds to the root stock; and 2) ensure that the bud's shoot grows straight during the spring. None of the conventional techniques and devices achieve these goals. Thus, it is desirable to provide a bud clip which overcomes the limitations and problems with the conventional techniques and devices and it is to this end that the present invention is directed.

SUMMARY OF THE INVENTION

The bud clip in accordance with the invention provides a device which ensures that a bud's shoot grows straight while reducing the labor costs involved in the budding process. The bud clip device may be inexpensive (e.g., made using a plastic injection molding process) so that the clip may be discarded after a limited number of uses. The bud clip may ensure that the bud shoot grows straight by providing a training groove to direct the growth of the bud. The bud clip may be clipped to the root stock so that the bud clip expands as the root stock grows and does not girdle the root stock. The bud clip does not need to be removed from the root stock since the root stock will grow and eventually the bud clip will pop off of the root stock. The bud clip may also include a horizontal tilt limiter which limits the amount of horizontal distance from vertical that the bud clip may be pushed by the bud shoot.

In accordance with another aspect of the invention, the bud clip may be manufactured out of a bio-degradable material so that the bud clip may ensure the straight growth of the bud and then fall apart and bio-degrade once its purpose is served so that the bud clips do not need to be removed from the root stock nor cleaned up after the budding process. In accordance with another aspect of the invention, the bud clip may be attached to the root stock once and used to 1) bind the bud to the root stock during the fall while the bud bonds to the root stock; and 2) ensure that the bud shoot grows straight up during the spring. The bud clip may also be used as a seeding cut back guide in the spring. In accordance with another aspect of the invention, the bud clip material may be impregnated with nitrogen or other fertilizers so that the bud clip may provide some fertilizer to the new bud during its bonding in the fall and growth in the spring.

Thus, in accordance with the invention, a bud clip for budding a bud onto a root stock is provided which comprises a clip portion, made of an elastic material, that clips the bud clip around the root stock, a guide portion attached to the clip portion that extends above the bud to guide the bud in a substantial vertical direction during the growth of the bud, and a tilt limiter, attached to the bottom of the guide portion, for preventing the guide portion from tilting beyond a predetermined angle from the vertical.

BRIEF DESCRIPTION OF THE DRAWINGS

FIGS. 3A–3D are diagrams illustrating a side view, a front view, a back view and a top view, respectively, of a preferred embodiment of a bud clip in accordance with the invention;

FIGS. 4A and 4B are diagrams illustrating the bud clip in accordance with the invention being used during the bud growth phase; and FIGS. 5A–5C are diagrams illustrating the bud clip in accordance with the invention being used for both the bud bonding and bud growth phases.

DESCRIPTION OF A PREFERRED EMBODIMENT

The invention is particularly applicable to a device for budding a fruit tree and it is in this context that the invention will be described. It will be appreciated, however, that the device in accordance with the invention has greater utility, such as to other types of trees and other budding processes. The bud clip may also be used for other types of plants, such as roses.

Figure 1:
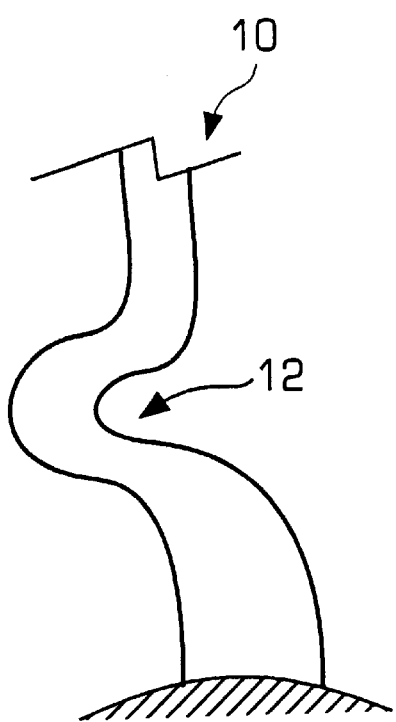
FIG. 1 is a diagram illustrating a budded tree having a crook.

FIG. 1 is a diagram illustrating a budded tree 10 having a crook 12. The crook 12 may be formed when a bud is bonded to the tree, but no supervision of the bud growth occurs. The budding process may be used, for example, to put a orange bud onto a citrus root stock. In particular, during the fall, a bud may be bound to the root stock of the tree so that the bud bonds with the root stock. In the spring, if the bud has properly bonded with the root stock, the bud will begin to grow. A bud shoot will typically first grow parallel to the ground (e.g., perpendicular to the root stock). After some horizontal growth, the bud shoot will eventually grow vertically towards the sun. The effect of the initial horizontal growth followed by the vertical growth causes the crook 12 to be formed. The crook does not substantially affect the strength or fruit producing capability of the tree, but people are unlikely to purchase a fruit tree with a crook.

Figure 2:
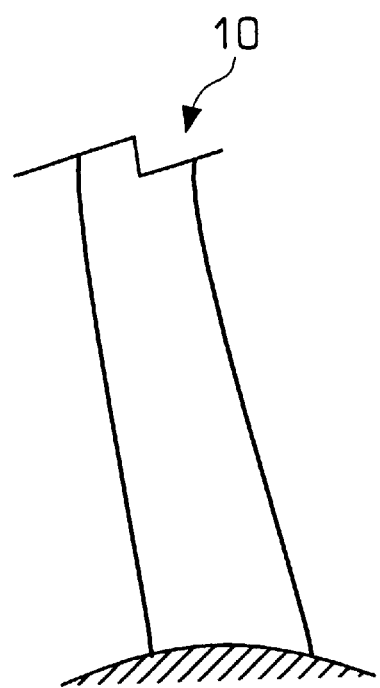
FIG. 2 is a diagram illustrating a budded tree having a straight trunk.

FIG. 2 is a diagram illustrating a budded tree 10 having a straight trunk. During the budding process for this tree, the bud growth was supervised is some manner so that the bud shoot grew straight up and a crook was not formed. The tree with the straight trunk is more desirable to a purchaser since it looks better than the tree shown in FIG. 1. A bud clip in accordance with the invention for ensuring the proper growth of the bud shoot will now be described.

FIGS. 3A–3D are diagrams illustrating a side view, a front view, a back view and a top view, respectively, of a preferred embodiment of a bud clip 20 in accordance with the invention. The bud clip may include a guide portion 22, a clip portion 24 and a tilt limiting portion 26. The clip portion 24 may be attached to the bottom of the guide portion 22 and the tilt limiting portion 26 may be attached to the bottom of the clip portion. The various portions of the bud clip 20 may be formed as a single piece of elastic, resilient material using various well known manufacturing techniques such as injection molding. In a preferred embodiment, the bud clip may be manufactured out of a resilient plastic material, such as nylon, polypropylene or polyethylene depending on the desired clamping action of the arms of the bud clip. The various portions of the bud clip 20 will now be described in more detail.

The guide portion 22 may be a variety of different shapes which guide the bud shoot vertically during its growth. In the preferred embodiment shown, the guide portion 22 may include a first guide wall 30 and a second guide wall 32 which are connected together at a predetermined angle, $\alpha$, to form a sloped valley between the walls. The bud shoot may be guided by the valley to grow vertically. In accordance with the invention, the guide portion is not limited to the shape described above and, for example, may also be an arcuate shape. The guide portion 22 may also include a bottom straight portion 33 (as shown in FIG. 3D) near the clip portion 24 so that the bud clip may more securely bind the bud to the root stock during the fall.

The clip portion 24 may include a first clip arm 34 and a second clip arm 36 which are formed so that they have an opening between the arms smaller than the root stock. Each clip arm 34, 36 may further include a first curved portion 38 and a second straight portion 40 attached to the curved portion. The location where the curved portion and the straight portion are attached together forms the narrow opening between the arms which is smaller than the root stock. Thus, to clip the bud clip to the root stock, the arms 34, 36 are moved away from each other so that the root stock may be inserted into a space 42 between the curved portions 38. The arms 34, 36 then spring back together since they are made out of resilient material and the curved portions 38 of the arms 34, 36 hold the bud clip onto the root stock.

The tilt limiting portion 26 may extend down from the clip portion 24 and may be wedge shaped. The tilt limiting portion 26, when the bud clip is clipped onto the root stock, is located adjacent to the root stock. Thus, if the bud shoot pushes against the bud clip and tilts the bud clip away from the root stock, the tilt limiter 26 prevents the bud clip from being tilted beyond a predetermined small angle to ensure that the bud shoot grows vertically even if the bud shoot is pushing against the bud clip.

In accordance with the invention, the bud clip material may be biodegradable so that the bud clip may ensure the straight growth of the bud shoot, fall off of the root stock as the root stock grows and then bio-degrade once it has fallen off of the root stock. In accordance with the invention, the bud clip material may also be impregnated with a fertilizer, such as nitrogen, so that the bud is provided with fertilizer during the bonding and growth phases. Now, the bud clip being used during the bud growth phase will be described.

FIGS. 4A and 4B are diagrams illustrating the bud clip 20 in accordance with the invention being used during the bud growth phase. As shown in FIG. 4A, after the root stock 10 has a bud 50 inserted into the root stock and the bud bonds with the root stock in the fall, the bud clip 20 is clipped onto the root stock in the spring. A portion of the guide portion 22 is above the bud 50 to guide the growth of the bud shoot. Then, as shown in FIG. 4B, while the bud shoot 51 grows, the bud clip 20 ensures that it grows straight up. As described above, the tilt limiter 26 permits the bud clip to tilt backwards at a predetermined small angle, $\beta$, as shown by the dotted outline of the guide portion so that the bud shoot 51 is substantially vertical when growing even if the bud shoot pushes against the guide portion. As the root stock grows, the bud clip 20 will eventually fall off of the root stock when the root stock pushes open the clip portion 24. In this manner, the bud clip does not girdle the root stock and eventually falls off of the root stock without having to be removed by hand. Now, the bud clip being used for fall bud bonding and spring bud shoot growth will be described.

FIGS. 5A–5C are diagrams illustrating the bud clip 20 in accordance with the invention being used for both the bud bonding and bud growth phases. In particular, the bud clip 20 may include a second clip portion 52 attached to the top of the guide portion 22. The second clip portion has a similar structure to the clip portion described above. The combination of the two clip portions 24, 52 clipped to the root stock binds the bud 50 to the root stock so that the bud bonds with the root stock as shown in FIG. 5A. The bonding of the root stock with the bud occurs during the fall season. When spring approaches and the bud starts to grow, the second clip portion 52 and the root stock above the bud are cut away from the guide portion as shown in FIG. 5B. Then, as the bud shoot 51 grows, the guide portion 22 of the bud clip 20 ensures that the bud shoot 51 grows vertically as described above. The tilt limiter 26 has the same function as described above. As with the other example, after the bud shoot grows straight and the root stock begins to expand its diameter, the bud clip eventually falls off of the root stock without having someone manually remove it from the root stock.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for grafting a bud onto a root stock, comprising:

placing a bud in the root stock;

clipping a bud clip around the location of the bud to bind the bud to the root stock, the bud clip having a lower and an upper clip that clip around the root stock, a guide portion for guiding the growth of a shoot from the bud and a tilt limiting portion for preventing the shoot from tilting the guide portion beyond a predetermined angle;

removing the upper clip of the bud clip and the root stock above the bud when a shoot from the bud starts to grow, the lower clip, the guide portion and tilt limiting portion remaining clipped to the root stock; and guiding the growth of the shoot substantially vertically using the guide portion of the bud clip.

2. The method of claim 1 further comprising releasing the bud clip from the root stock as the root stock grows and opens the lower clip portion.

* * * * *